US011167922B2

(12) United States Patent
Lindbo et al.

(10) Patent No.: US 11,167,922 B2
(45) Date of Patent: Nov. 9, 2021

(54) ROBOTIC CONTAINER HANDLING DEVICE AND HANDLING METHOD

(71) Applicant: Ocado Innovation Limited, Hatfield (GB)

(72) Inventors: Lars Sverker Ture Lindbo, Hatfield (GB); Andrew John Ingram-Tedd, Hatfield (GB); Pawel Karolinczak, Hatfield (GB); Matthew Whelan, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 17/000,900

(22) Filed: Aug. 24, 2020

(65) Prior Publication Data
US 2020/0391942 A1    Dec. 17, 2020

Related U.S. Application Data

(63) Continuation of application No. 15/555,907, filed on Sep. 5, 2017, now Pat. No. 10,752,440.

(51) Int. Cl.
*B65G 1/04* (2006.01)
*B65G 57/03* (2006.01)
(Continued)

(52) U.S. Cl.
CPC .......... *B65G 1/0464* (2013.01); *A01G 9/022* (2013.01); *A01G 9/16* (2013.01); *A01G 9/18* (2013.01);
(Continued)

(58) Field of Classification Search
CPC .. B65G 1/0464; B65G 1/0407; B65G 1/0478; B65G 1/065; B65G 1/137; B65G 57/03;
(Continued)

(56) References Cited

U.S. PATENT DOCUMENTS 2,701,065 A    2/1955   Bertel
3,559,822 A *  2/1971   Lichtenford .......... B66C 19/002
                                                    414/140.3
(Continued)

FOREIGN PATENT DOCUMENTS

DE    2719953 A1    7/1978
DE    4439740 C1    5/1996
(Continued)

OTHER PUBLICATIONS

Office Action (Communication) dated Dec. 22, 2020, by the European Patent Office in corresponding European Patent Application No. 16720056.7. (6 pages).
(Continued)

*Primary Examiner* — Glenn F Myers
(74) *Attorney, Agent, or Firm* — Buchanan Ingersoll & Rooney PC

(57) ABSTRACT

A system and method for handling shipping containers is described. The container handling system comprises a crane, the crane comprising crane load handling devices. The container handling system further comprises conveyance means, the conveyance means further comprising transversal load handling devices. The system further comprises storage and sortation means for storing the containers in a series of stacks disposed beneath a grid, the grid comprising a series of load handling devices operable thereon. The crane load handling device removes a container from a ship, transports it to transversal load handling means operable on a conveyor. The container is moved on the conveyor to a transfer point where it is collected by a robotic load handling device for transport to the storage and sortation area.

17 Claims, 19 Drawing Sheets

(51) Int. Cl.

| | | |
|---|---|---|
| E04H 6/18 | (2006.01) | |
| A01G 9/02 | (2018.01) | |
| A01G 9/16 | (2006.01) | |
| A01G 9/18 | (2006.01) | |
| A01G 31/06 | (2006.01) | |
| A47L 7/00 | (2006.01) | |
| B62D 33/02 | (2006.01) | |
| B65D 21/02 | (2006.01) | |
| B65G 1/06 | (2006.01) | |
| B65G 1/137 | (2006.01) | |
| B65G 63/00 | (2006.01) | |
| B65G 67/02 | (2006.01) | |
| E04B 1/348 | (2006.01) | |
| E06B 9/68 | (2006.01) | |

(52) U.S. Cl.
CPC ............ A01G 31/06 (2013.01); A47L 7/0047 (2013.01); B62D 33/02 (2013.01); B62D 33/0207 (2013.01); B65D 21/0212 (2013.01); B65G 1/0407 (2013.01); B65G 1/0478 (2013.01); B65G 1/065 (2013.01); B65G 1/137 (2013.01); B65G 57/03 (2013.01); B65G 63/004 (2013.01); B65G 67/02 (2013.01); B65G 2207/22 (2013.01); B65G 2207/40 (2013.01); E04B 1/34807 (2013.01); E04H 6/18 (2013.01); E06B 9/68 (2013.01); E06B 2009/6818 (2013.01); Y02A 40/25 (2018.01); Y02P 60/14 (2015.11); Y02P 60/21 (2015.11); Y10S 901/01 (2013.01)

(58) Field of Classification Search
CPC ............... B65G 67/02; B65G 2207/22; B65G 2207/40; Y02P 60/21; Y02P 60/14; Y02A 40/25; A01G 9/022; A01G 9/16; A01G 9/18; A01G 31/06; A47L 7/0047; B62D 33/02; B62D 33/0207; B65D 21/0212; E04H 6/18; Y10S 901/01; E04B 1/34807; E06B 9/68; E06B 2009/6818
See application file for complete search history.

(56) References Cited

U.S. PATENT DOCUMENTS

| | | | |
|---|---|---|---|
| 3,744,193 | A | 7/1973 | Lau et al. |
| 4,088,232 | A | 5/1978 | Lilly et al. |
| 4,561,554 | A | 12/1985 | Swincicki et al. |
| 4,599,829 | A | 7/1986 | DiMartino et al. |
| 4,723,381 | A | 2/1988 | Straumsnes et al. |
| 4,917,429 | A | 4/1990 | Giger |
| 4,973,219 | A | 11/1990 | Brickner et al. |
| 6,152,287 | A | 11/2000 | Luria |
| 6,654,662 | B1 | 11/2003 | Hognaland |
| 8,408,863 | B1 | 4/2013 | Benedict et al. |
| 8,550,035 | B2 | 10/2013 | Moreno et al. |
| 8,628,289 | B1 | 1/2014 | Benedict et al. |
| 2002/0057956 | A1 | 5/2002 | Jephcott et al. |
| 2003/0005626 | A1 | 1/2003 | Yoneda et al. |
| 2003/0141973 | A1 | 7/2003 | Yeh et al. |
| 2003/0156501 | A1 | 8/2003 | Spindel et al. |
| 2004/0016624 | A1 | 1/2004 | Jephcott et al. |
| 2005/0220573 | A1 | 10/2005 | Benedict et al. |
| 2006/0201377 | A1 | 9/2006 | Gielow et al. |
| 2007/0016328 | A1 | 1/2007 | Ziegler et al. |
| 2008/0075566 | A1 | 3/2008 | Benedict et al. |
| 2008/0075568 | A1 | 3/2008 | Benedict et al. |
| 2008/0075569 | A1 | 3/2008 | Benedict et al. |
| 2008/0134458 | A1 | 6/2008 | Ziegler et al. |
| 2008/0140255 | A1 | 6/2008 | Ziegler et al. |
| 2008/0155768 | A1 | 7/2008 | Ziegler et al. |
| 2008/0213073 | A1* | 9/2008 | Benedict ............... B66C 7/12 414/279 |
| 2009/0191028 | A1 | 7/2009 | Tian |
| 2010/0275512 | A1 | 11/2010 | Nien et al. |
| 2011/0027059 | A1 | 2/2011 | Benedict et al. |
| 2011/0192082 | A1 | 8/2011 | Uchiyama |
| 2011/0271469 | A1 | 11/2011 | Ziegler et al. |
| 2012/0036659 | A1 | 2/2012 | Ziegler et al. |
| 2012/0147558 | A1 | 6/2012 | Dunn et al. |
| 2012/0272500 | A1 | 11/2012 | Reuteler et al. |
| 2013/0011226 | A1 | 1/2013 | Camenisch et al. |
| 2013/0236279 | A1 | 9/2013 | Franzen et al. |
| 2013/0236284 | A1 | 9/2013 | Alba et al. |
| 2014/0026474 | A1 | 1/2014 | Kulas et al. |
| 2014/0069007 | A1 | 3/2014 | Chen et al. |
| 2014/0191633 | A1 | 7/2014 | Zhu et al. |
| 2014/0283452 | A1 | 9/2014 | Dittman et al. |
| 2014/0289992 | A1 | 10/2014 | Ziegler et al. |
| 2015/0045944 | A1 | 2/2015 | Visser et al. |
| 2015/0112476 | A1 | 4/2015 | Torson et al. |
| 2015/0127143 | A1 | 5/2015 | Lindbo et al. |
| 2016/0095309 | A1 | 4/2016 | Reuteler |
| 2016/0129587 | A1 | 5/2016 | Lindbo et al. |
| 2016/0140488 | A1 | 5/2016 | Lindbo |

FOREIGN PATENT DOCUMENTS

| | | |
|---|---|---|
| DE | 102011103443 A1 | 12/2012 |
| DE | 102012025154 A1 | 6/2014 |
| EP | 0767113 B1 | 7/2002 |
| EP | 1037828 B1 | 9/2003 |
| EP | 2133289 A1 | 12/2009 |
| EP | 2308283 A1 | 4/2011 |
| EP | 2783913 A2 | 10/2014 |
| EP | 2829210 A2 | 1/2015 |
| GB | 1157145 A | 7/1969 |
| GB | 2514930 A | 12/2014 |
| GB | 2518259 A | 3/2015 |
| GB | 2520104 A | 5/2015 |
| GB | 2527543 A | 12/2015 |
| GB | 2528573 A | 1/2016 |
| GB | 2529029 A | 2/2016 |
| GB | 2529527 A | 2/2016 |
| JP | H09299496 A | 11/1997 |
| JP | 2000255786 A | 9/2000 |
| LU | 88754 A1 | 10/1996 |
| NO | 317366 B1 | 10/2004 |
| WO | 92/04713 A1 | 3/1992 |
| WO | 9738928 A1 | 10/1997 |
| WO | 9849075 A1 | 11/1998 |
| WO | 03/031285 A1 | 4/2003 |
| WO | 03/095339 A1 | 11/2003 |
| WO | 2004/096609 A1 | 11/2004 |
| WO | 2008/108845 A2 | 9/2008 |
| WO | 2011/047710 A1 | 4/2011 |
| WO | 2013/082601 A1 | 6/2013 |
| WO | 2013/147597 A1 | 10/2013 |
| WO | 2013/162192 A1 | 10/2013 |
| WO | 2013/167907 A1 | 11/2013 |
| WO | 2013/169110 A1 | 11/2013 |
| WO | 2014/195901 A1 | 12/2014 |
| WO | 2014/203126 A1 | 12/2014 |
| WO | 2015/105426 A1 | 7/2015 |

OTHER PUBLICATIONS

Fourth Office Action dated Jan. 28, 2021, by the Chinese Patent Office in corresponding Chinese Patent Application No. 201680021766.5, and an English Translation of the Office Action. (14 pages).

Office Action (Final Office Action) dated Feb. 24, 2021, by the Japanese Patent Office in corresponding Japanese Patent Application No. 2017-554369, and an English Translation of the Office Action. (5 pages).

Search Report dated Mar. 8, 2016, by the European Patent Office for Application No. 1518089.6.

Search Report dated Dec. 21, 2016, by the European Patent Office for Application No. 1606677.1.

(56) References Cited

OTHER PUBLICATIONS

Search Report dated Dec. 22, 2016, by the European Patent Office for Application No. 1606679.7.
PCT/EP2016/058366, "International Search Report Received", dated Aug. 30, 2016.
PCT/EP2016/058366, "Written Opinion Received", dated Aug. 30, 2016.
PCT/EP2016/058381, "International Search Report Received", dated Jul. 18, 2016.
PCT/EP2016/058381, "Written Opinion Received", dated Jul. 18, 2016.
PCT/EP2016/058384, "International Search Report Received", dated Jul. 19, 2016.
PCT/EP2016/058384, "Written Opinion Received", dated Jul. 19, 2016.
PCT/EP2016/058385, "International Search Report Received", dated Jul. 14, 2016.
PCT/EP2016/058385, "Written Opinion Received", dated Jul. 14, 2016.
PCT/EP2016/058405, "International Search Report Received", dated Jul. 18, 2016.
PCT/EP2016/058405, "Written Opinion Received", dated Jul. 18, 2016.
PCT/EP2016/058407, "International Search Report Received", dated Jul. 14, 2016.
PCT/EP2016/058407, "Written Opinion Received", dated Jul. 14, 2016.
PCT/EP2016/058466, "International Search Report Received", dated Jul. 20, 2016.
PCT/EP2016/058466, "Written Opinion Received", dated Jul. 20, 2016.
PCT/EP2016/058467, "International Search Report Received", dated Jul. 15, 2016.
PCT/EP2016/058467, "Written Opinion Received", dated Jul. 15, 2016.

* cited by examiner

ROBOTIC CONTAINER HANDLING DEVICE AND HANDLING METHOD

The present invention relates to a robotic system device and method for the handling of shipping containers in ports. More specifically but not exclusively, it relates to how an established technology for order picking and sortation of smaller items can be scaled up to create a high density, high throughput system for handling shipping containers in ports.

This application claims priority from UK Patent Application Nos. GB1506365.4 filed 15 Apr. 2015, GB1514428.0 filed 13 Aug. 2015, GB1518089.6 filed 13 Oct. 2015, GB1602332.7 filed 9 Feb. 2016, GB1518091.2 filed 13 Oct. 2015, GB1518094.6 filed 13 Oct. 2015, GB1518111.8 filed 13 Oct. 2015, GB1518115.9 filed 13 Oct. 2015, GB1518117.5 filed 13 Oct. 2015 and GB1603328.4 filed 25 Feb. 2016 the content of all these applications hereby being incorporated by reference.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above, removing the need for aisles to allow for movement of the containers between the rows and allowing more containers to be stored in a given space.

Shipping containers have revolutionised international trade over the last decades. As ships have got bigger, the methods for loading and unloading containers have evolved so that a large ship with over ten thousand containers may be loaded in around 24 hours. Even so, there would be huge benefits if container ships could be unloaded and loaded even faster. Not only would the costly idle time for the ship be reduced, but the capacity of the port would also be increased if the ships could be handled faster. The present invention would potentially speed up the unloading and loading of container ships by a factor of 2 or better, compared of the best prior art technology.

In addition, the handling at a container port frequently involves storing and sorting the containers to or from other ships, trains or vehicles. This storage and sortation activity requires large amounts of space and expensive handling equipment. The present invention would also speed up the sortation process and reduce the dock area required for storage and sortation. This would potentially add to the increased capacity of a given port, by a factor 2 or better, compared to the best prior at technology.

Methods of handling containers stacked in rows are well known. In some such systems, for example as described in U.S. Pat. No. 2,701,065 Bertel, comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 1037828 B1 (Autostore), the contents of which are incorporated herein by reference. This describes a system in which stacks of containers are arranged within a frame structure. A system of this type is illustrated schematically in Figures x to y of the accompanying drawings. Robotic load handling devices can be controllably moved around the stack on a system of tracks on the upper most surface of the stack.

One development of load handling device is described in UK Patent Publication No GB2,520,104A1, where each robotic load handler only covers one grid space, thus allowing higher density of load handlers and thus higher throughput of a given size system. As described in UK Patent Application No GB1511137.0, hereby incorporated by reference, containers may also be of varying heights. As described in UK Patent Application No 1509921.1, combining shuttles with the load handlers occupying only a single grid space, may be beneficial and on a larger scale can also be very beneficial in the handling of shipping containers.

According to the invention there is provided a robotic container handling system comprising two substantially perpendicular sets of rails forming a grid above a workspace, the workspace comprising a plurality of stacked containers, the handling system further comprising a plurality of robotic load handling devices operating on the grid above the workspace, the robotic load handling devices comprising a body mounted on wheels, a first set of wheels being arranged to engage with at least two rails of the first set of rails, the second set of wheels being arranged to engage with at least two rails of the second set of rails, the first set of wheels being independently moveable and driveable with respect to the second set of wheels such that when in motion only one set of wheels is engaged with the grid at any one time thereby enabling movement of the load handling device along the rails to any point on the grid by driving only the set of wheels engaged with the rails, the system further comprising transfer means, conveyance means and a transfer point, the transfer means comprising a number of tranversal load handling devices adapted so as to receive containers delivered by a container handling device, the transfer load handling devices being moveable along the conveyance means to a transfer point for collection by the robotic load handling devices.

The invention will now be described with reference to the accompanying diagrammatic drawings in which:

FIG. 1 is a schematic representation of a known form of container port system showing a vessel carrying shipping containers docked at a port;

FIG. 2 is a schematic representation of a further known form of container port system showing an arriving vessel and a departing vessel docked in port, the arriving vessel having a plurality of containers unloaded therefrom, the departing vessel having a plurality of containers loaded thereto, a portion of the containers being stored in sortation and storage areas and moved between locations via vehicles;

Figure 5:
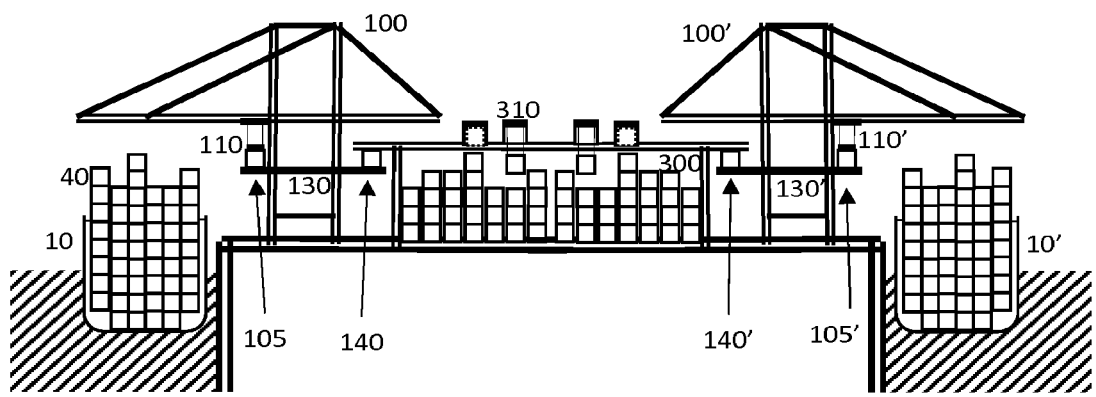
Figure 6:
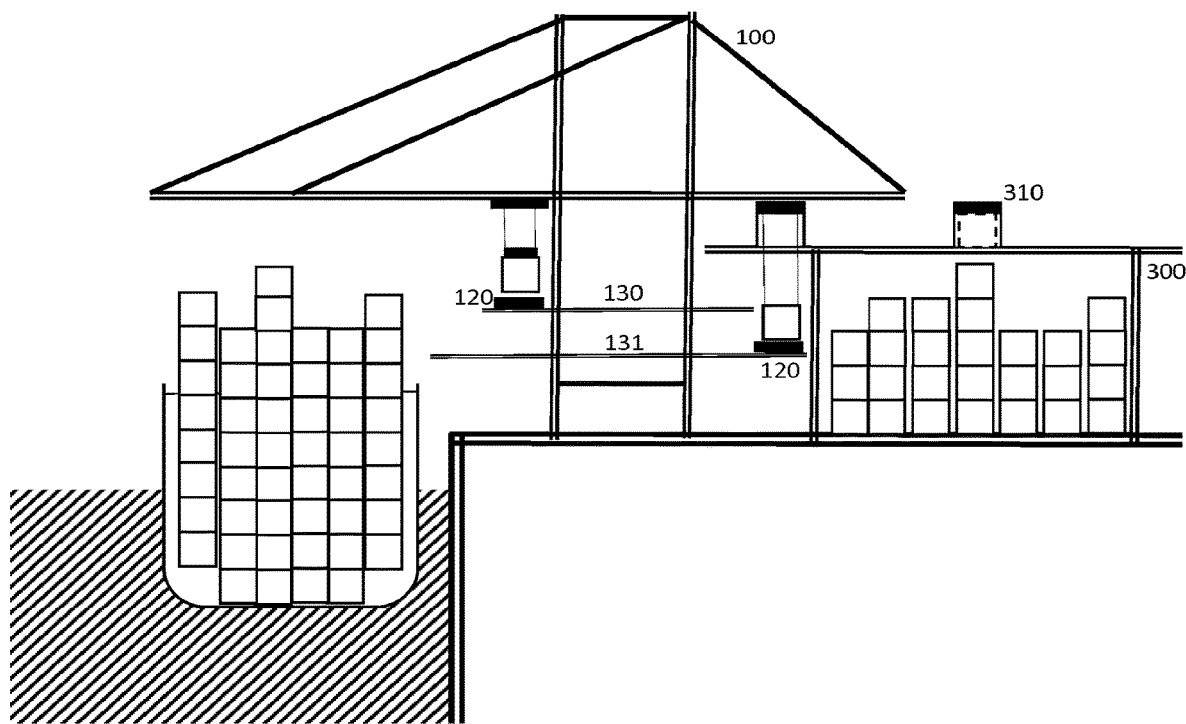
Figure 7:
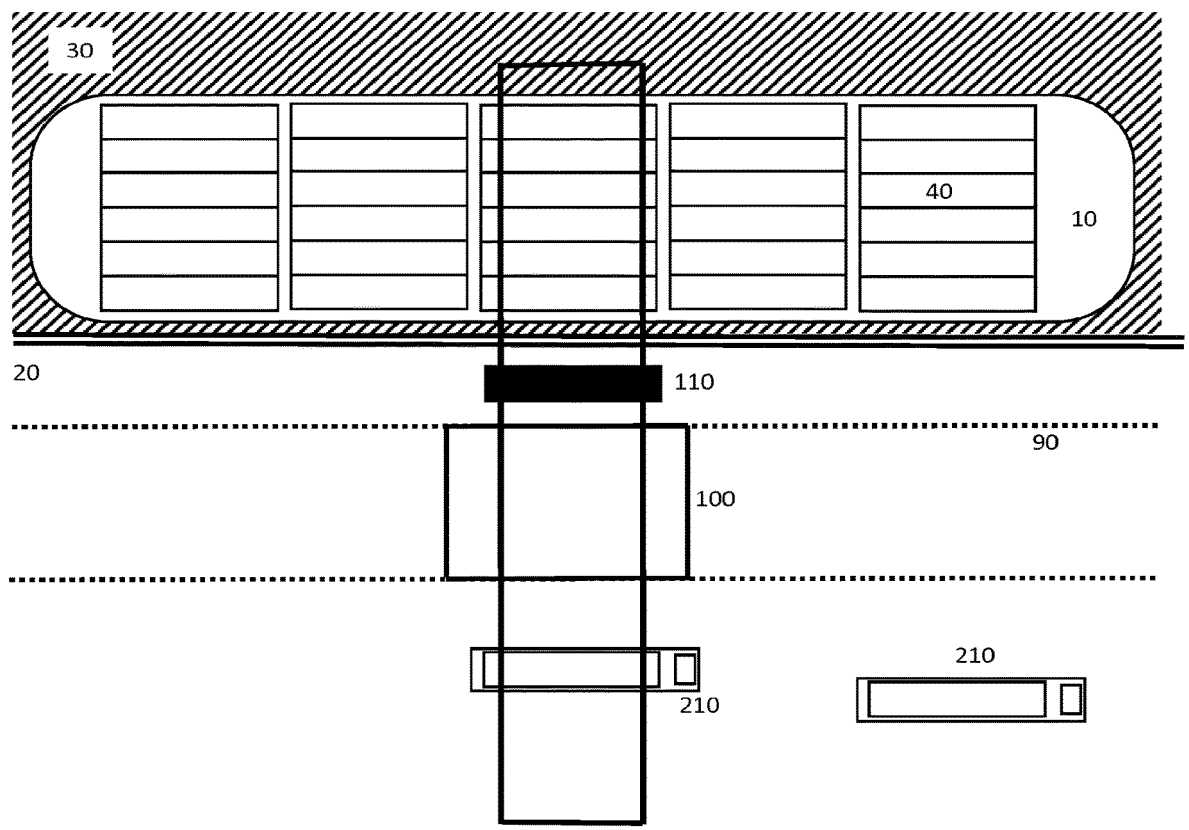
Figure 8:
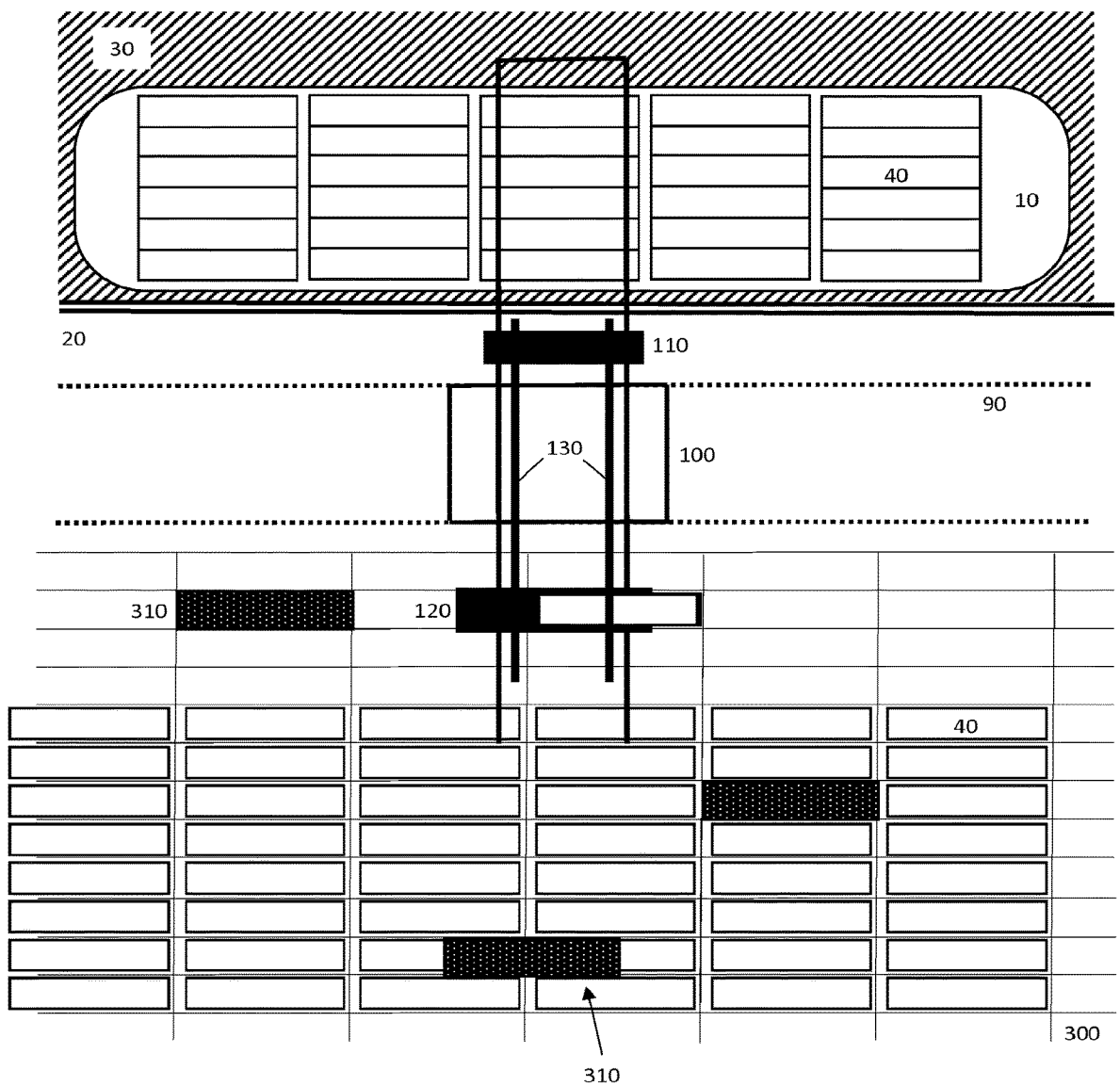
Figure 9:
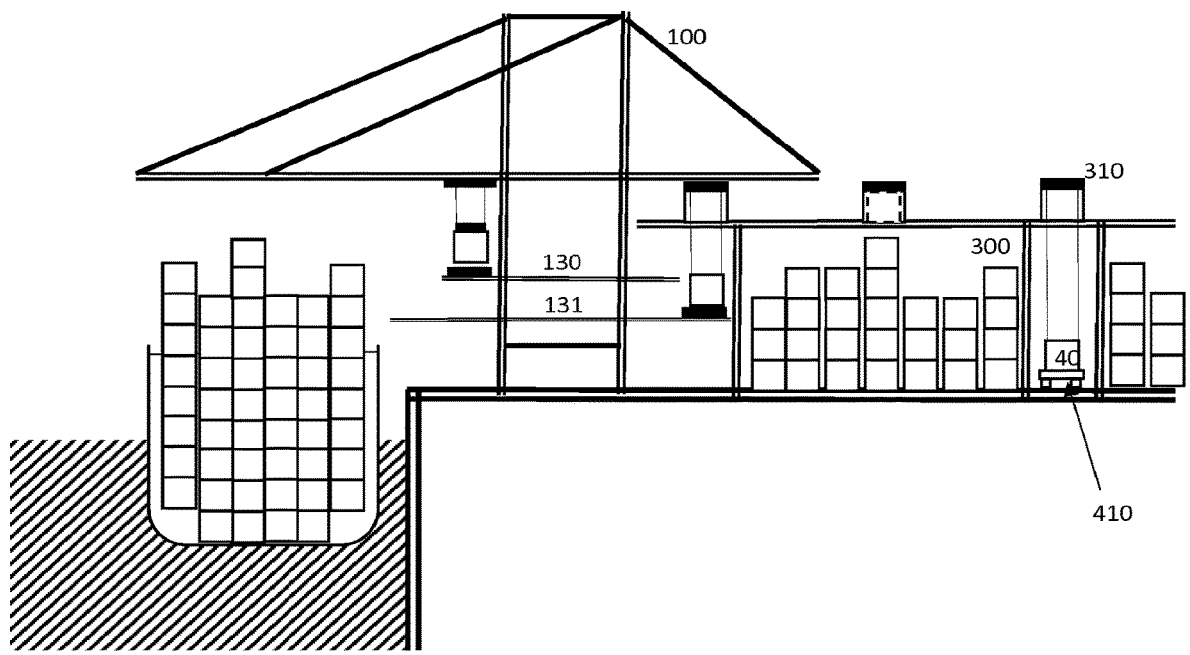
Figure 10:
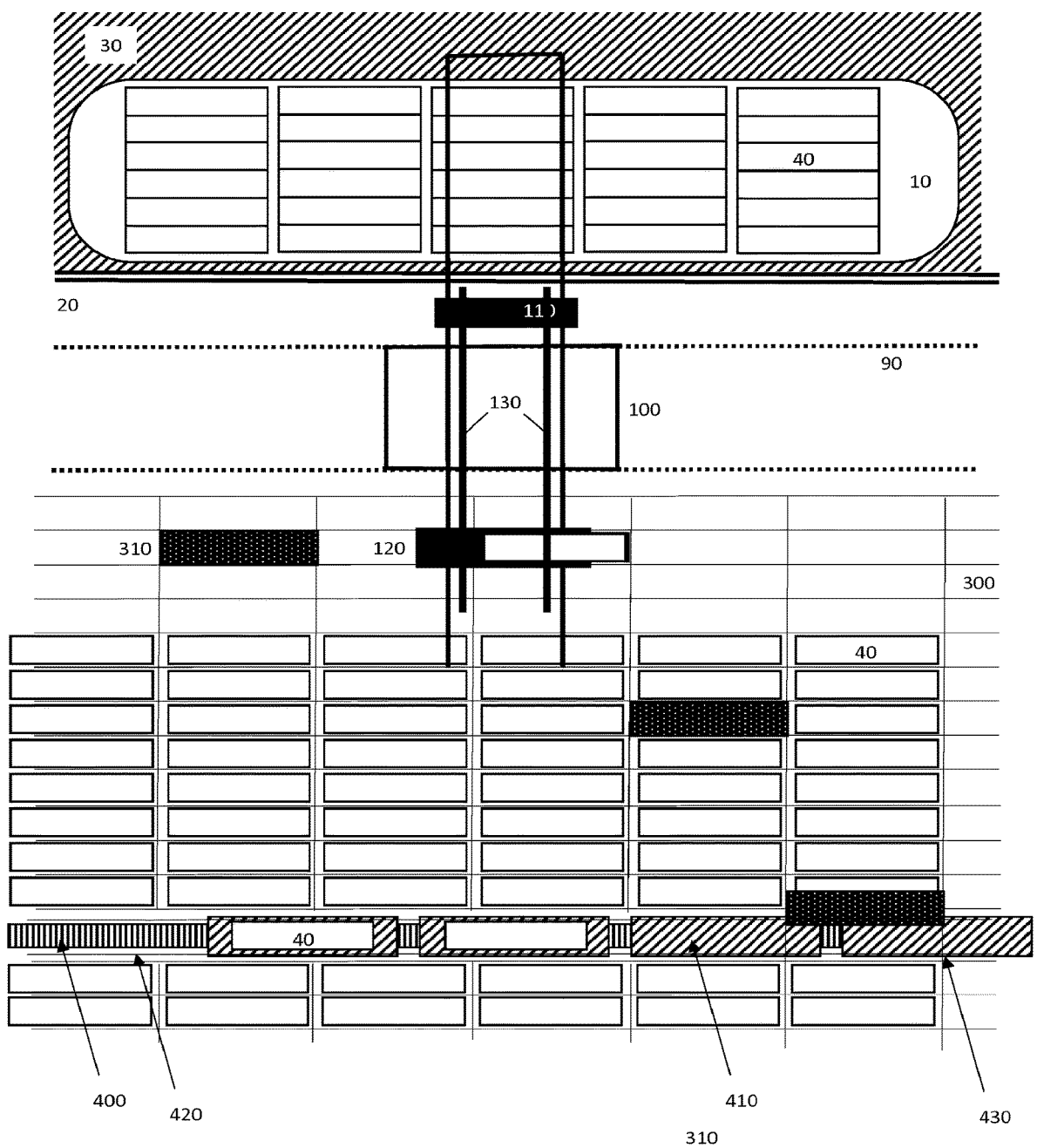
Figure 11:
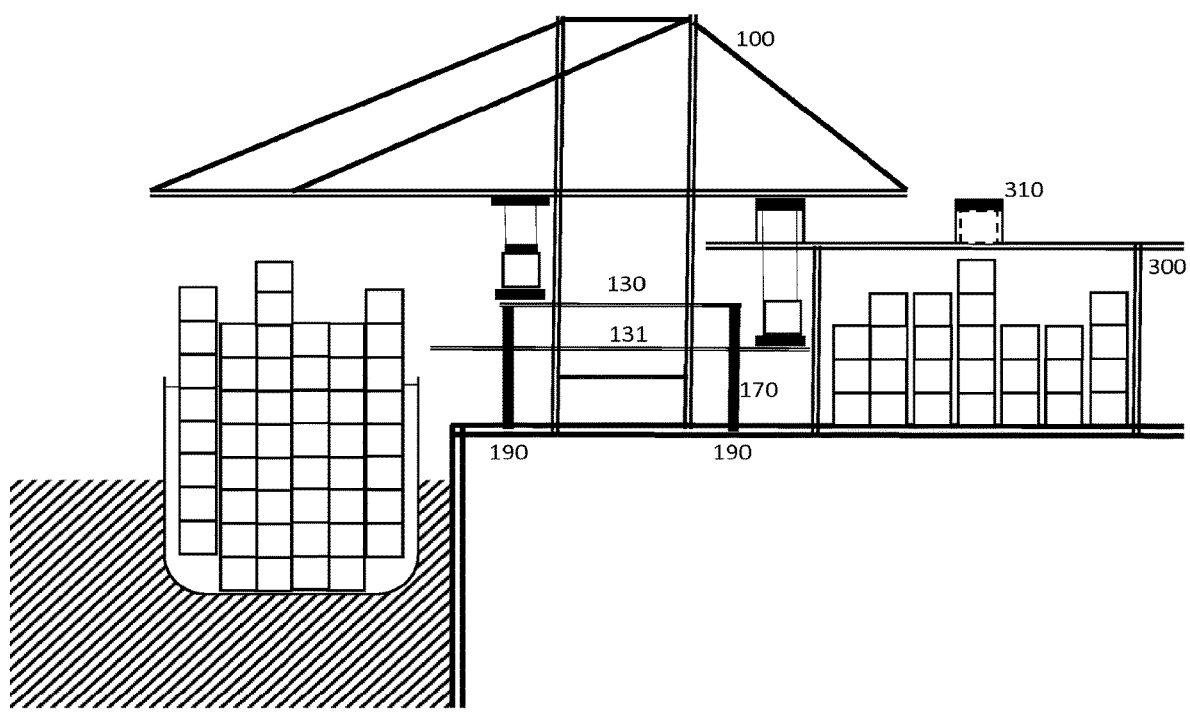
Figure 12:
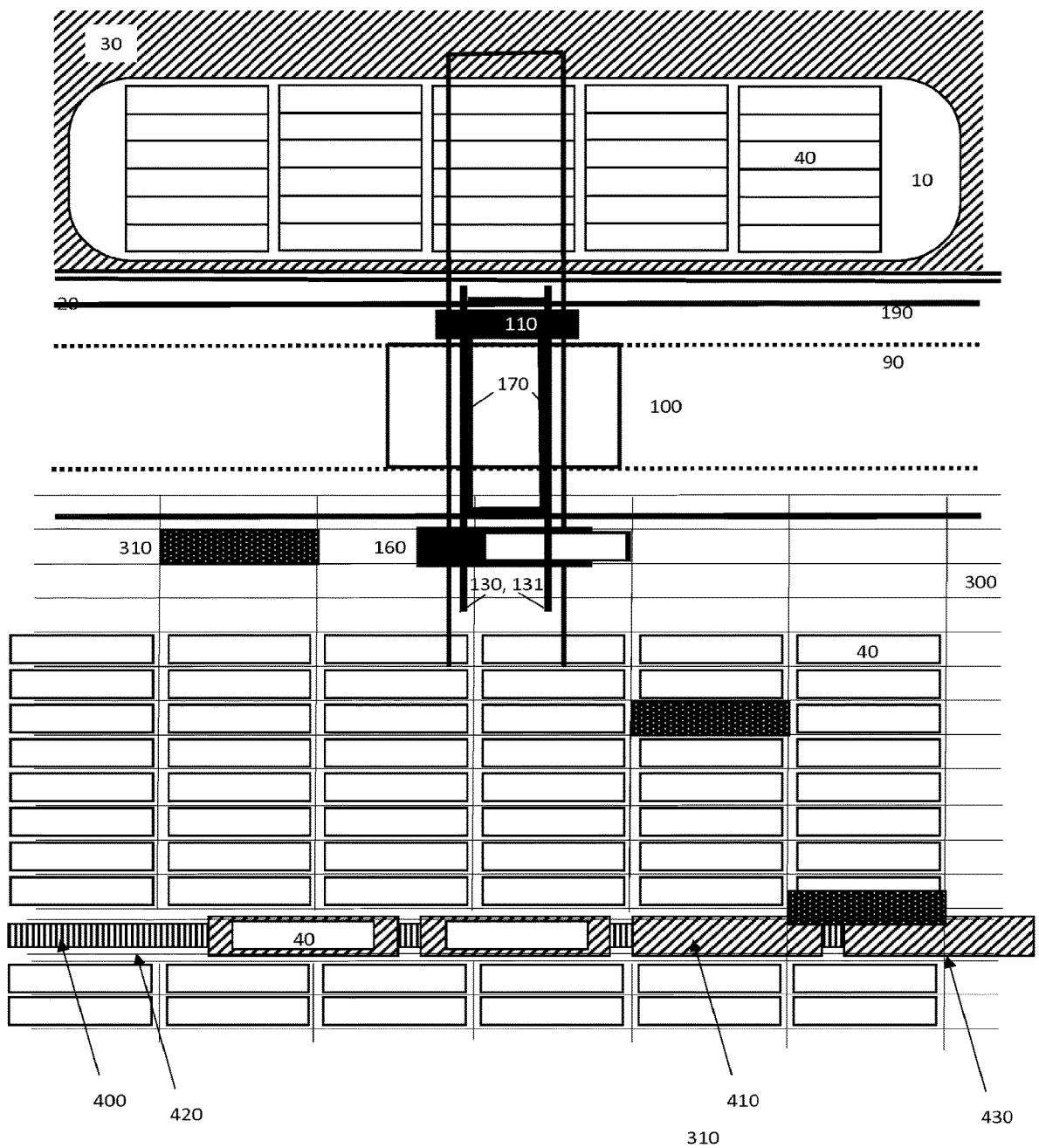
Figure 13:
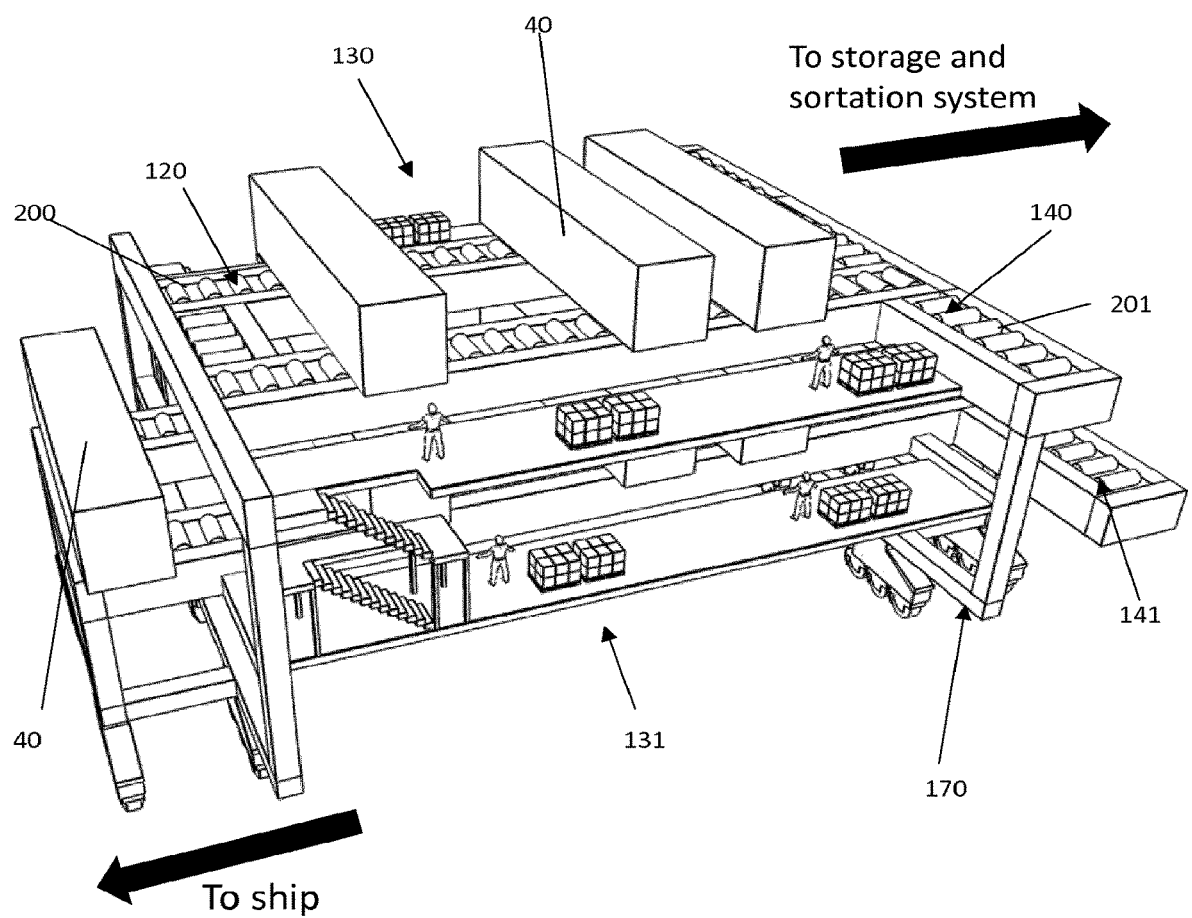
Figure 14:
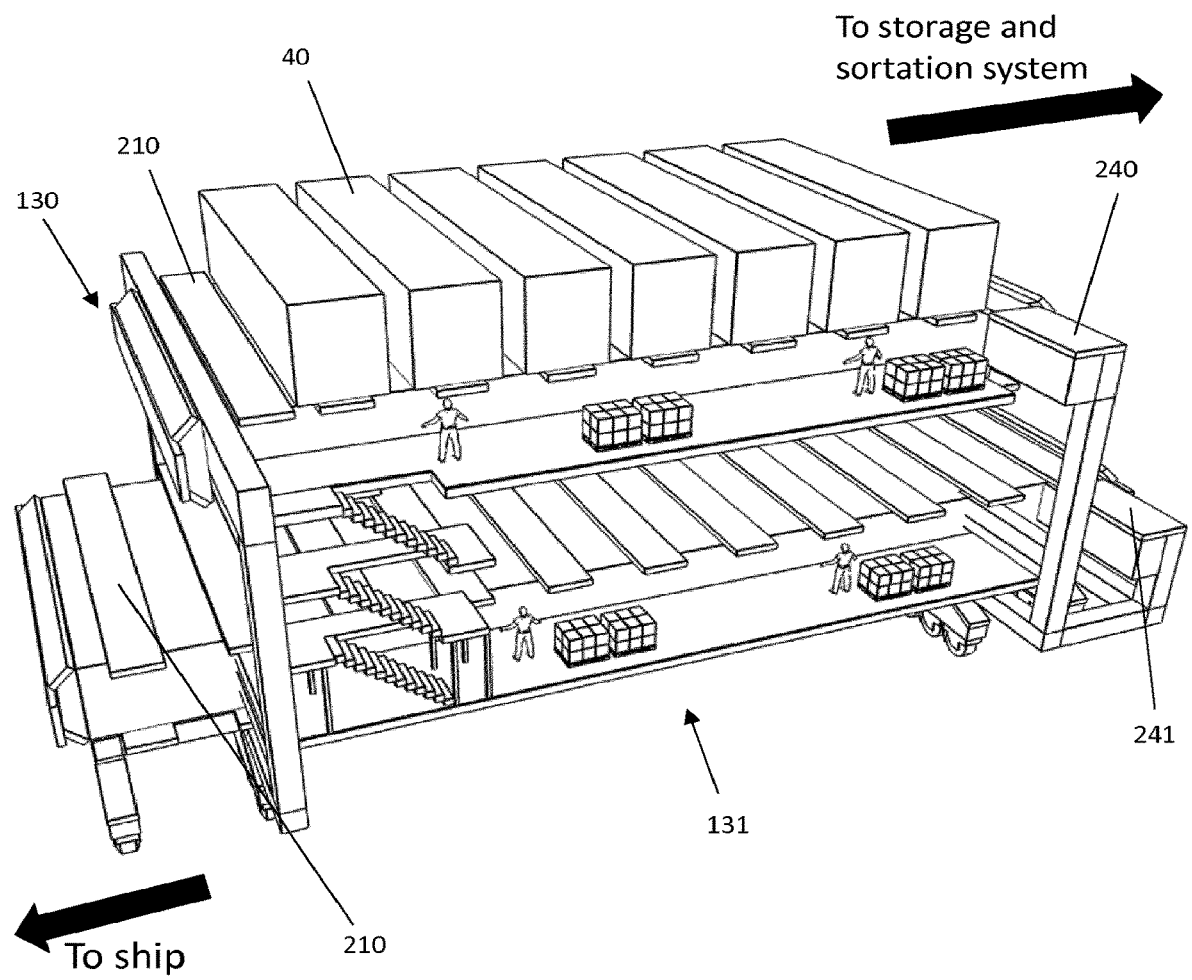
Figure 15:
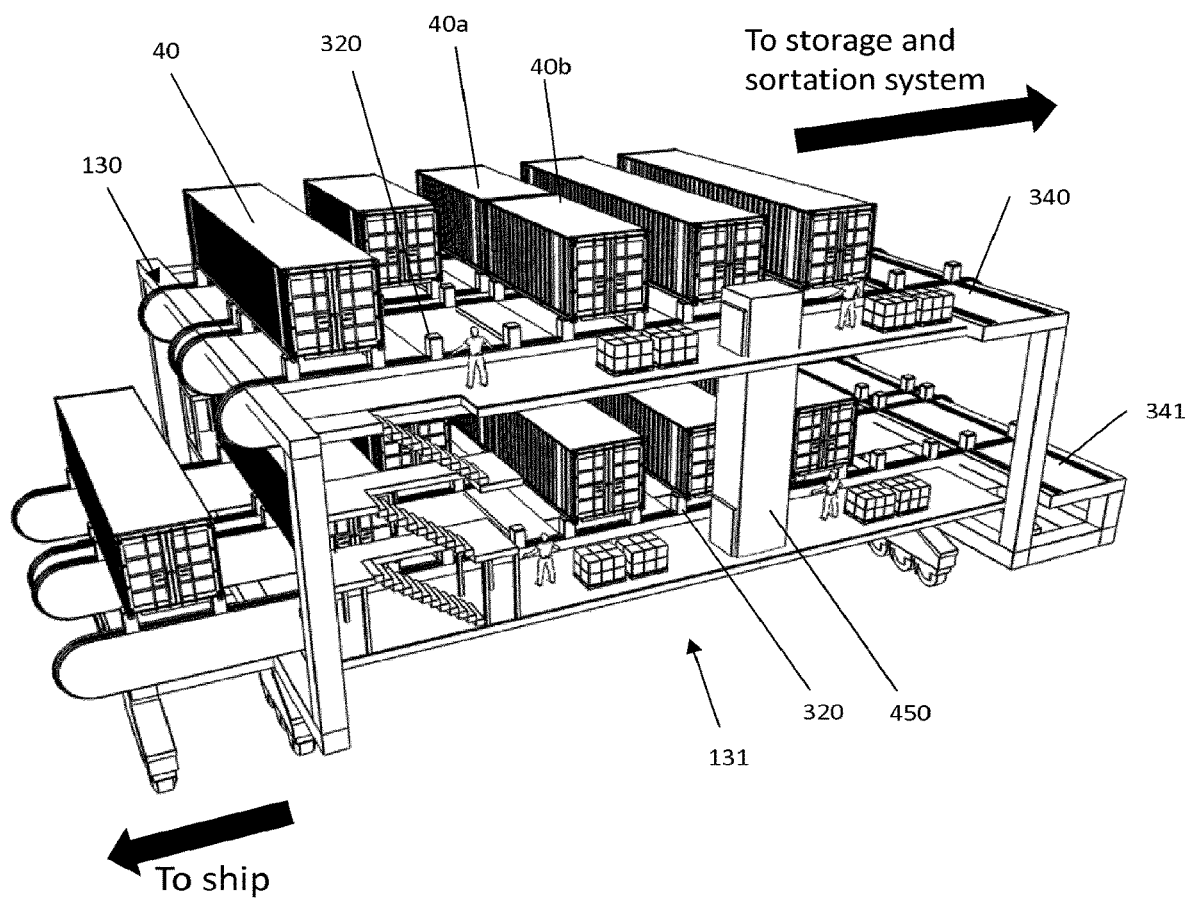
Figure 16A:
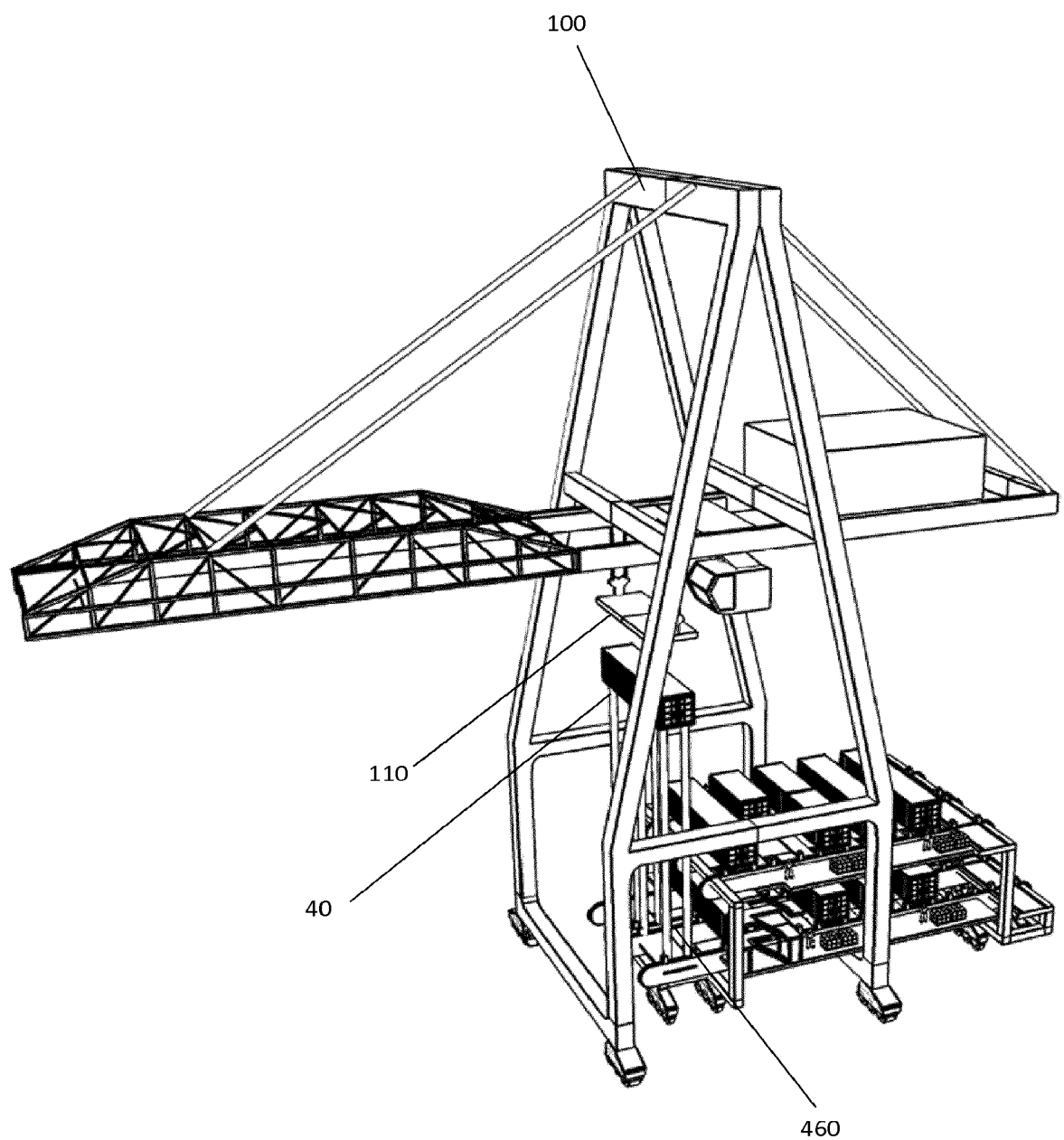
Figure 16B:
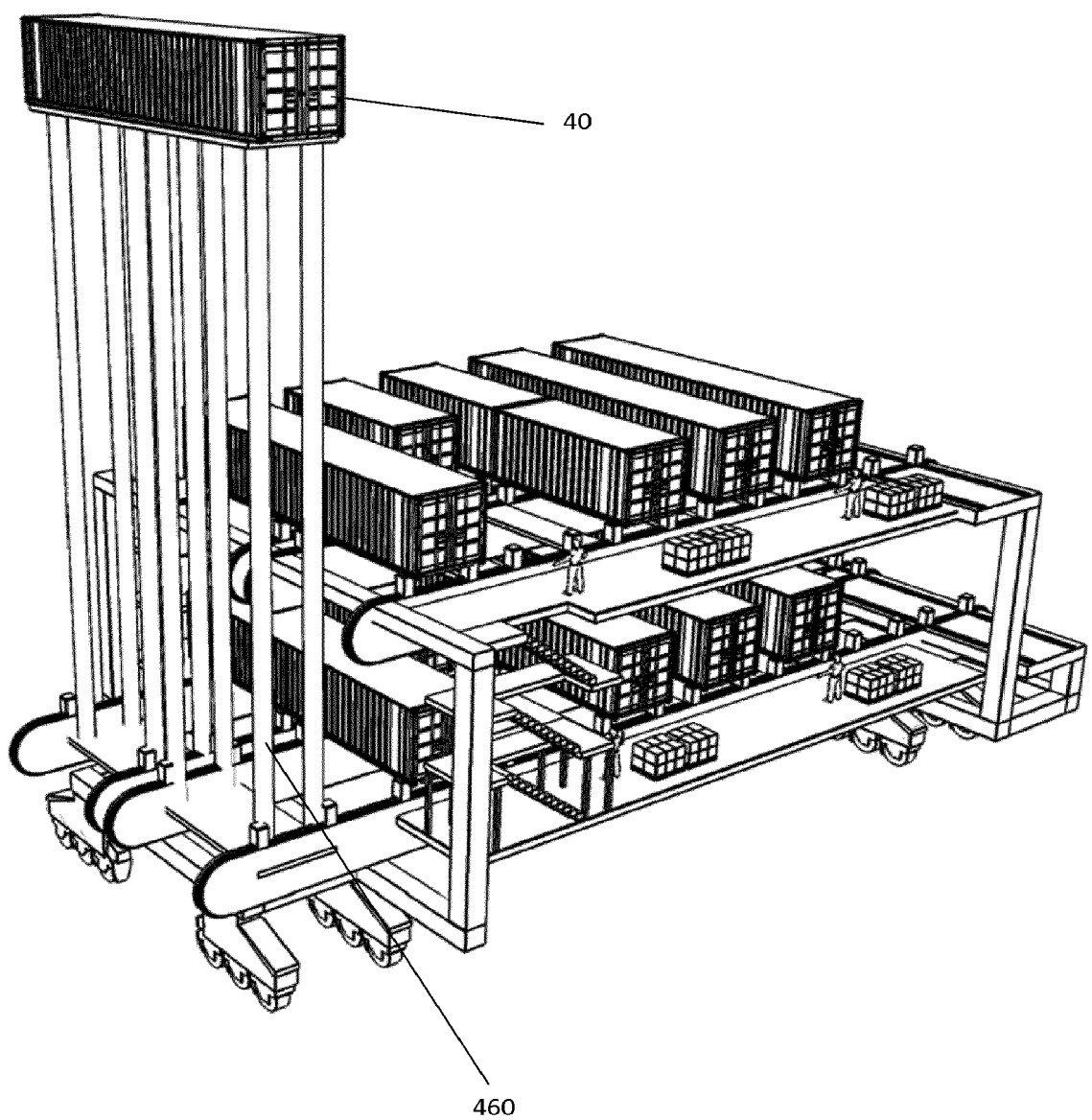
Figure 17:
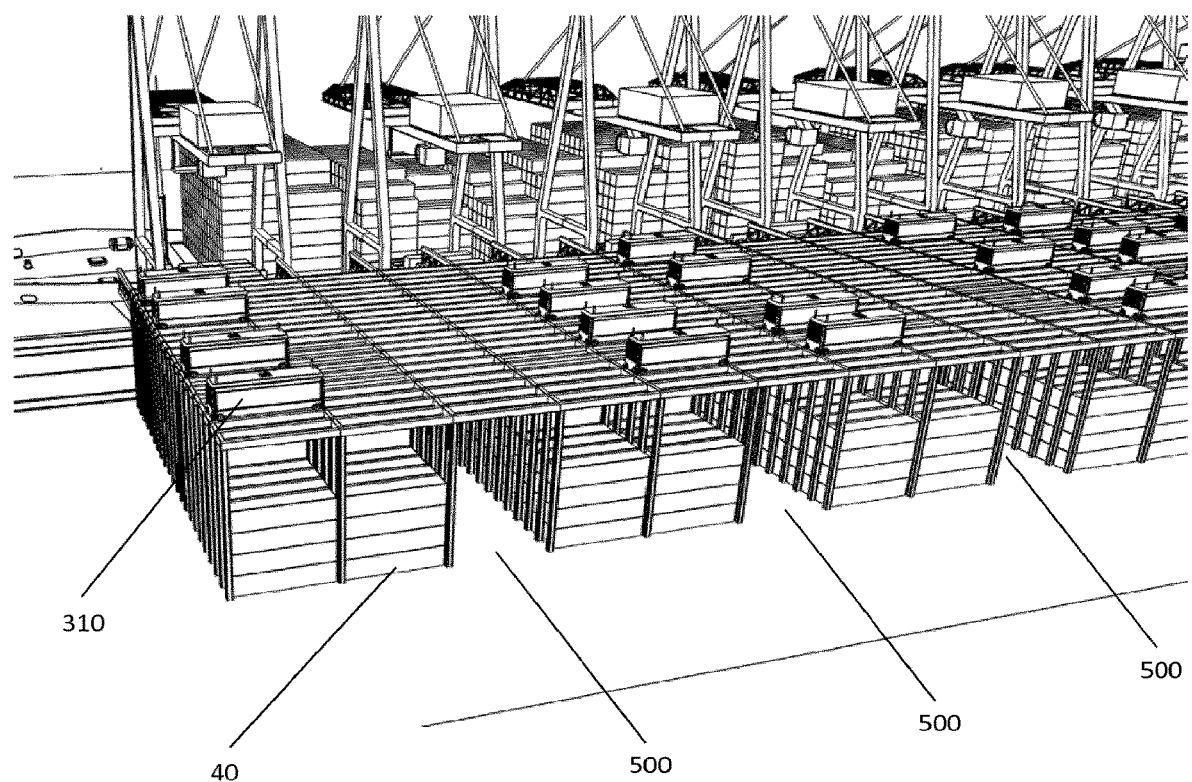
Figure 18:
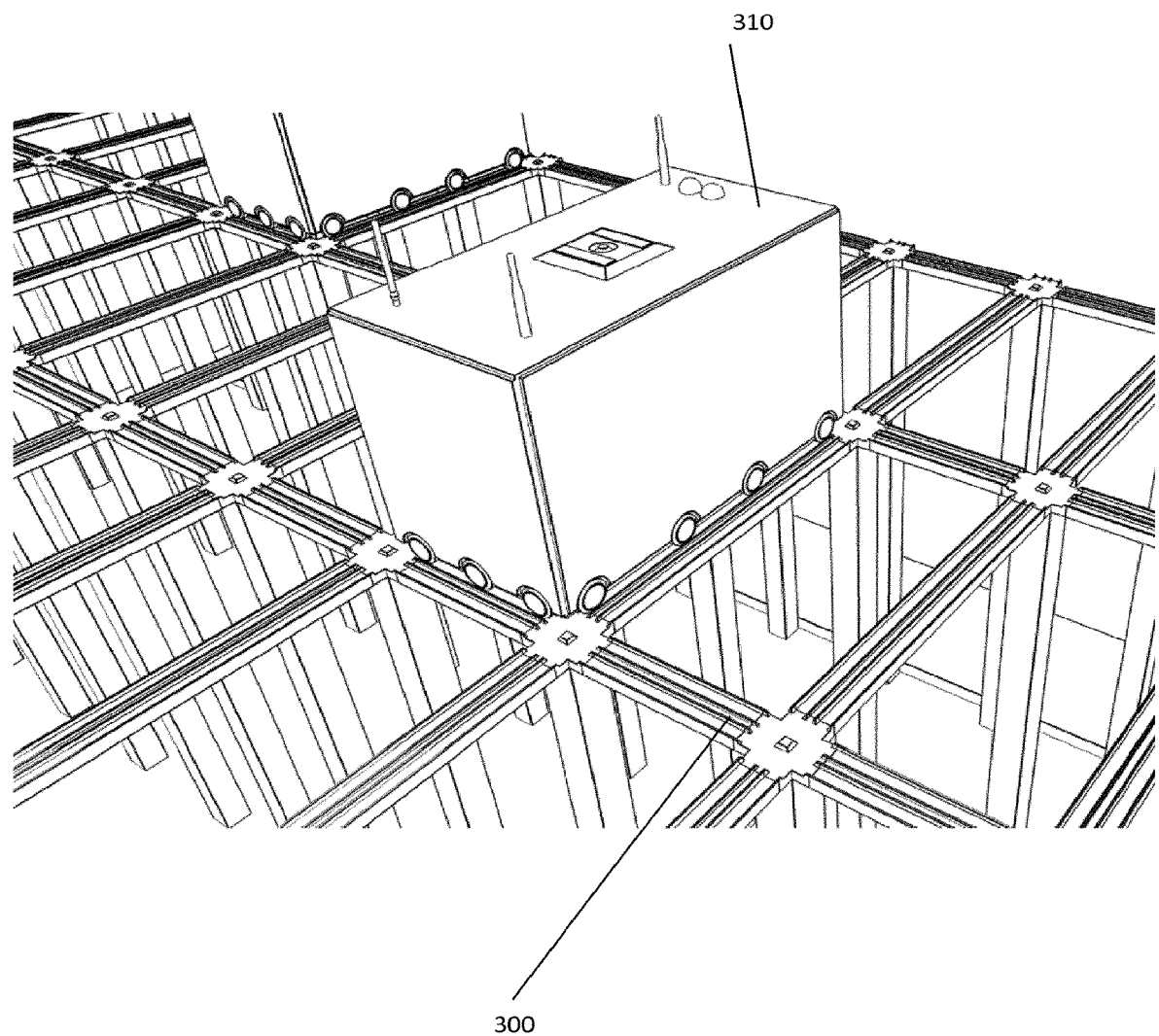

FIG. 5 is a schematic representation of a form of container port system in accordance with a further form of the invention showing an arriving vessel and a departing vessel docked in port, the arriving vessel having a plurality of containers unloaded therefrom, the departing vessel having a plurality of containers loaded thereto, a portion of the containers being stored in sortation and storage areas via a container handling system in accordance with the invention;

FIG. 6 is a schematic representation of a further form of container port system in accordance with the invention in which the capacity of the crane-mounted load handlers is increased by addition of transversal load handling mechanisms;

FIG. 7 is a schematic plan view of a known form of container port system showing a vessel carrying shipping containers docked at a port, the containers being unloaded from the vessel via crane means and directly unloaded to container transporting vehicles;

FIG. 8 is a schematic plan view of a container port system in accordance with a further aspect of the invention in which crane-mounted load handlers transfer the containers to conveyance means, the conveyance means transferring the containers to a storage and sortation area, the containers being transferred to the storage and sortation area via robotic load handling devices;

FIG. 9 is a schematic view of the container port system of FIG. 8 in accordance with a further aspect of the invention, in which robotic load handling devices transfer containers from the storage and sortation area directly to container carrying vehicles;

FIG. 10 is a schematic plan view of a container port system in accordance with another form of the invention, the robotic load handling devices transferring containers from the storage and sortation area directly to container carrying trains, a portion of the grid of the storage and sortation system extending over the container carrying trains;

FIG. 11 is a schematic view of a further embodiment of the invention where the support structure for the transversal load handlers is separate from the crane. This is particularly advantageous where the system is added to an existing crane installation;

FIG. 12 is a schematic plan view of the arrangement in FIG. 11;

FIG. 13 is a perspective view in more detail of the arrangement of FIGS. 11 and 12 in which the support structure for the conveyance means and the transversal load handlers is a separate structure to any existing crane installation, the conveyance means and the transversal load handling means comprising roller means;

FIG. 14 is a perspective view of a further form of the support structure of FIGS. 11 and 12 in which the conveyance means comprises interface plates disposed between the containers to be moved and the drive means for moving the containers;

FIG. 15 is a perspective view of a further form of the support structure of FIGS. 11 and 12 in which the conveyance means comprises interface blocks disposed between the containers to be moved and the drive means for moving the containers, the underside corners of the containers being accessible to operatives from the support structure;

FIG. 16a is a perspective view of an alternative form of the container port system as shown at least in FIGS. 13 to 16, the system being located in situ under a gantry or quay crane, the system comprising a hydraulic lift to raise containers from the level of the port system of the invention to the crane load handler, thereby reducing the lifting and lowering that the load handler is required to undertake;

FIG. 16b is a further view of the container port system of FIG. 16a the gantry crane being removed for clarity;

FIG. 17 is a schematic perspective view of a further form of the storage and sortation system detailed above, the system being provided with walkways between rows of containers to allow operatives access to the containers within the storage and sortation system; and FIG. 18 is a schematic perspective view of a container handling device in situ on the storage and sortation device, the handling device running on a double track system forming part of the framework of the storage and shipping system, thereby enabling container handling devices to pass each other in either the X or Y direction whilst operating on the system.

Figure 1:
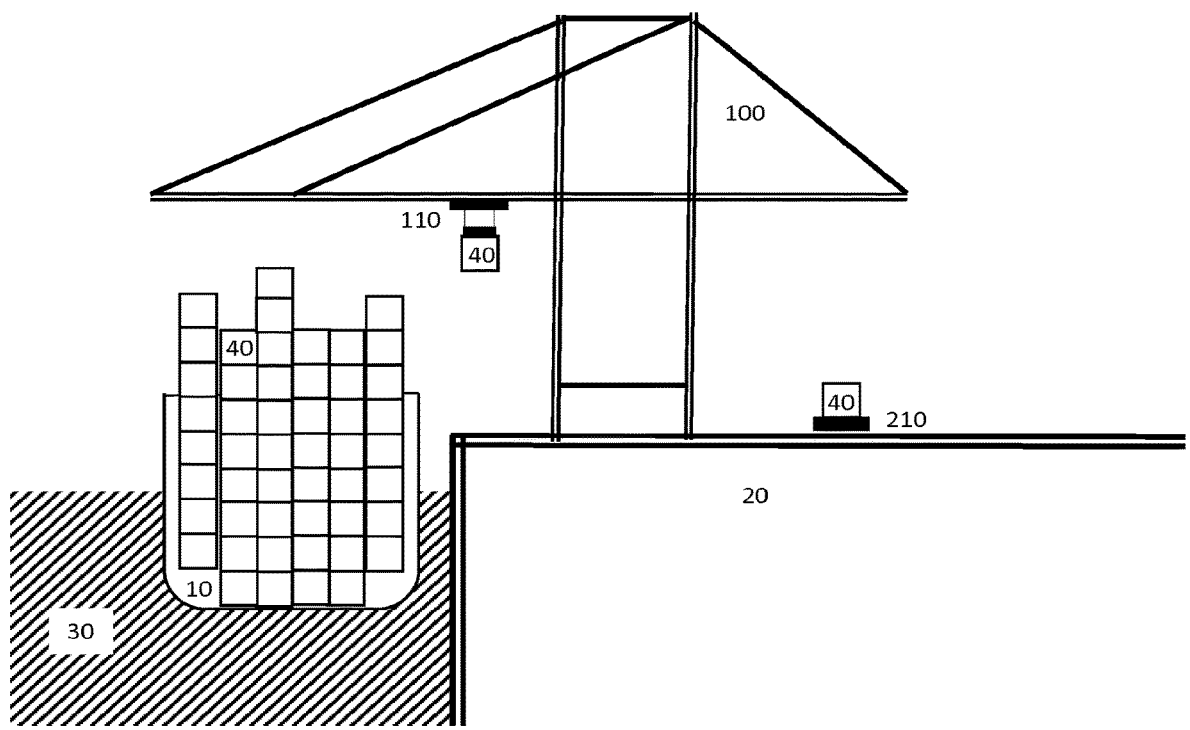

FIG. 1 shows one form of known container port. A container ship 10 in a body of water 30 is moored to a dock 20 with a plurality of shipping containers 40 disposed thereon. The shipping containers 40 are unloaded using a crane 100, the crane comprising a crane load handler 110. The crane load handler 110 transports the container 40 to a container transport vehicle 210. The container transport vehicle 210 transports the container 40 to its required destination. This may be to a storage and sortation area or may be directly to vehicles for onward transportation. In the reverse process, vehicles 210 bring shipping containers 40 to be loaded onto the ship 10 to the port, the containers 40 being transferred to the ship 10 via the crane 100.

Figure 2:
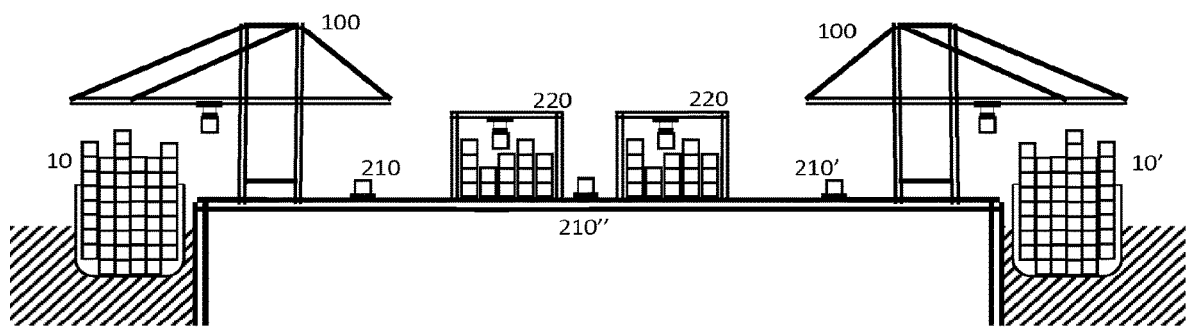

It will be appreciated that this is a simplified version of a container port. It is often the case that multiple ships 10 are moored at a given port at any one time. In this case, containers 40 may be unloaded from one ship and loaded directly on to another ship. Alternatively, containers 40 are unloaded from both vessels and transferred to a storage and sortation area awaiting onward transport. An example of such a known system is shown in FIG. 2 where vehicles 210 bring unloaded containers 40 unloaded from an arriving ship 10 by a gantry or quay crane 100 to a storage and sortation system 220 for storage and/or sortation. Thereafter vehicles 210' bring the required containers 40 to a predetermined dispatch ship 10'. During the sortation process, additional vehicles 210" may be needed to move containers 40 between gantry cranes 100 for onward loading to appropriate vessels 10. It will be appreciated that not all containers 40 unloaded from an arriving ship 10 need be transferred to the departing ship 10'. Moreover, not all the unloaded containers 40 need be transferred to the storage and sortation area. It will be noted, as shown in FIG. 2 that the containers 40 unloaded from the ship 10 may be handled by numerous handling devices and may be required to be transferred multiple times. Furthermore, a significant amount of space is needed to unload, store, sort and load containers 40.

Figure 3:
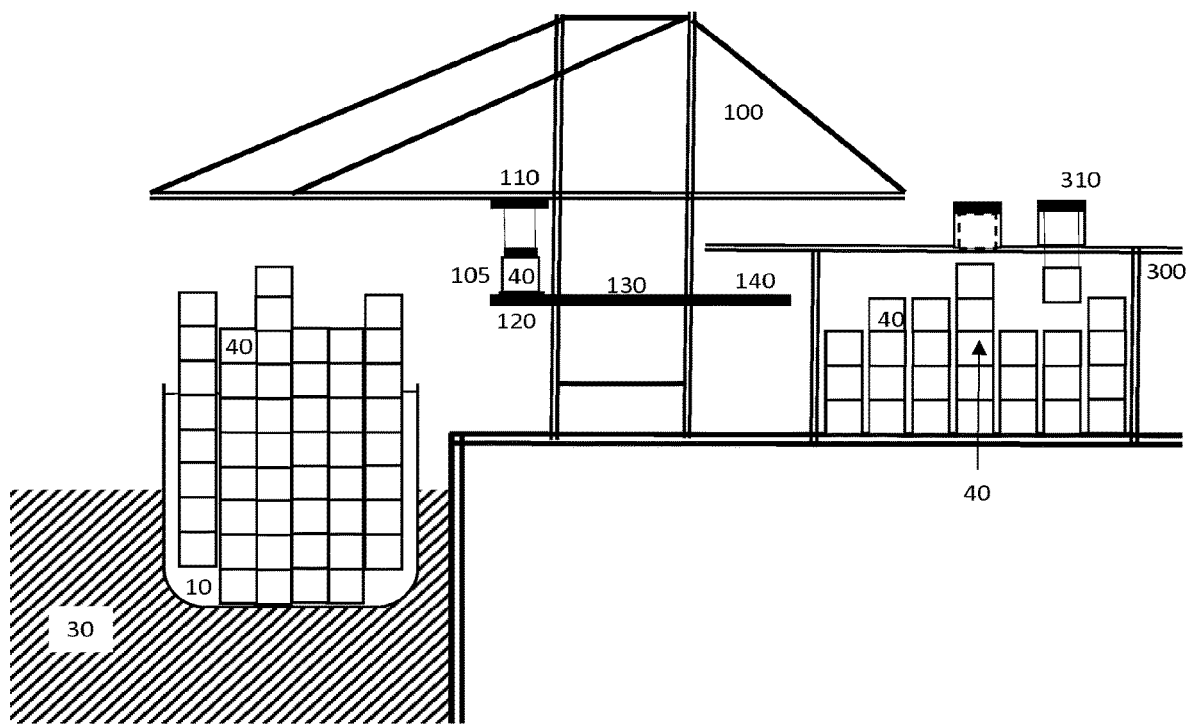
FIG. 3 is a schematic representation of a form of container port system in accordance with one form of the invention, showing a vessel carrying containers, the containers being unloaded via crane-mounted load handlers and transferred by conveyor means to a storage and sortation area, the containers being transferred in to and from the storage and sortation area via robotic load handling devices.

FIG. 3 shows a schematic view of one form of the present invention. As can be seen in FIG. 3, in common with existing known container port systems, the container handling system in accordance with the invention comprises a crane 100, the crane 100 comprises a crane load handling device 110. The container handling system further comprises conveyance means 130, the conveyance means 130 further comprises transversal load handling devices 120.

The container handling system further comprises container storage and sortation means. The storage and sortation means comprises a framework of uprights 280 carrying a substantially horizontal grid structure 300 on which robotic load handling devices 310 are operative. The containers 40 are disposed beneath the grid 300 in stacks 400. The stacks 400 are arranged such that a single stack 400 of containers is located beneath a single grid spacing in the grid 300 such that the robotic load handling devices 310 may raise and lower the containers 40 in to and out of the stacks 400 through the grid spacing.

Figure 4:
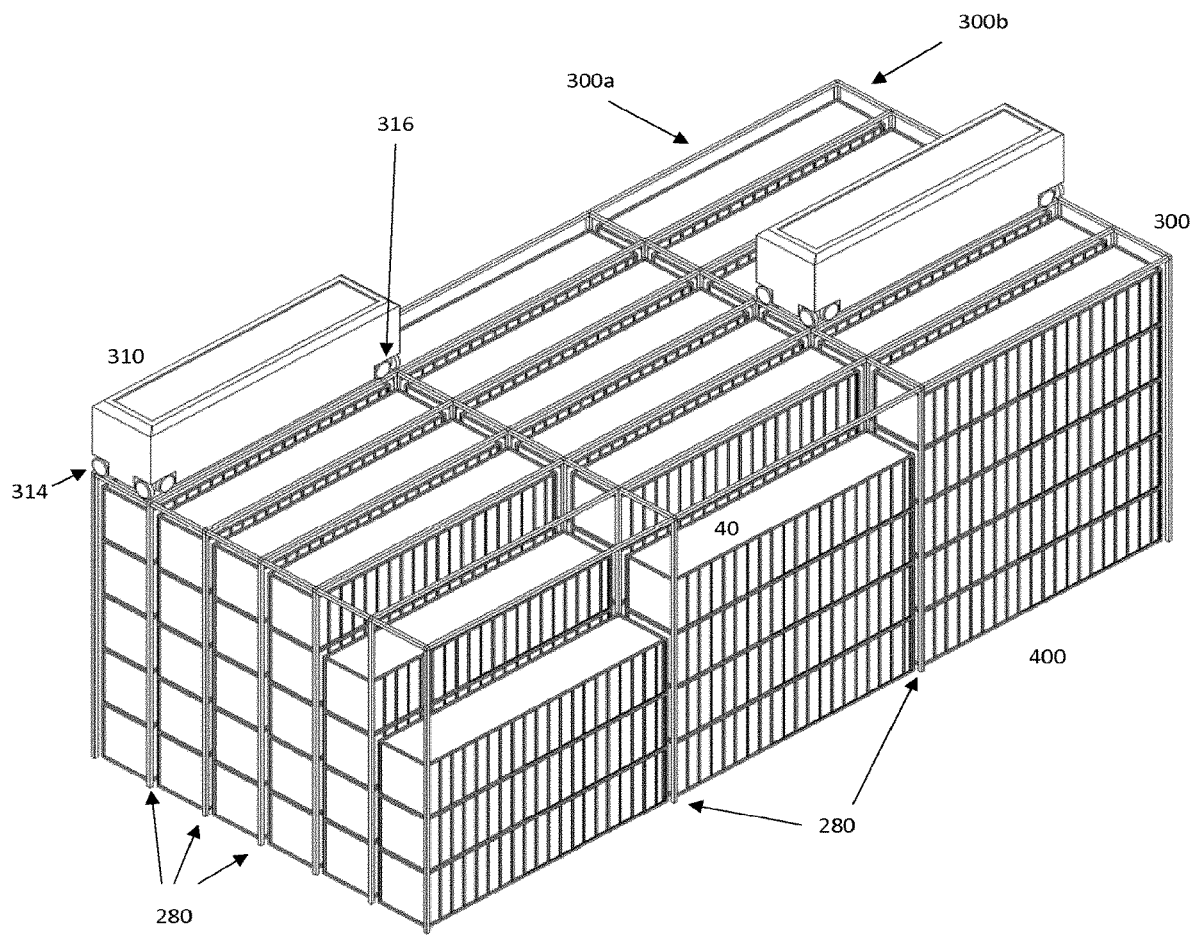
FIG. 4 is a schematic representation of a portion of the storage and sortation area of FIG. 3 showing two robotic load handling devices operative on a grid structure the containers being stored in stacks.

The robotic load handling devices 310, the stacks 400 of containers 40 and the grid structure 300 are shown in more detail in FIG. 4. The shipping containers 40 are stacked on top of one another to form stacks 400. Each container 40 typically holds items (not shown), and the items within a container 40 may be identical, or may be of different types depending on the application.

The storage and sortation structure comprises a plurality of upright members 280 that support horizontal members 300a, 300b. A first set of parallel horizontal members 300a is arranged substantially perpendicularly to a second set 300b of parallel horizontal members to form a plurality of horizontal grid structures 300 supported by the upright members 280. The members 280, 300a, 300b, 300 are typically manufactured from metal. The containers 40 are stacked between the members 280 of the frame structure.

The top level of the frame structure includes rails 300a, 300b arranged in a grid pattern across the top of the stacks 400. The grid structure 300 supports a plurality of robotic load handling devices 310. A first set of substantially parallel rails guide movement of the load handling devices 310 in a first direction (X) across the top of the frame structure, and a second set of substantially parallel rails, arranged substantially perpendicular to the first set, guide movement of the robotic load handling devices 310 in a second direction (Y), substantially perpendicular to the first direction. In this way, the rails allow movement of the load handling devices 310 in two dimensions in the X-Y plane, such that a load handling device 310 can be moved into position above any of the stacks 400.

Each load handling device 310 comprises a vehicle which is arranged to travel in the X and Y directions on the rails of the frame structure, above the stacks 400. A first set of wheels 314, consisting of a pair of wheels 314 on the front of the vehicle and a pair of wheels 314 on the back of the vehicle, are arranged to engage with two adjacent rails of the first set of rails. Similarly, a second set of wheels 316, consisting of a pair of wheels 316 on each side of the vehicle 310, are arranged to engage with two adjacent rails of the second set of rails. Each set of wheels 314, 316 can be lifted and lowered, so that either the first set of wheels 314 or the second set of wheels 316 is engaged with the respective set of rails at any one time.

When the first set of wheels 314 is engaged with the first set of rails and the second set of wheels 316 are lifted clear from the rails, the wheels 314 can be driven, by way of a drive mechanism (not shown) housed in the vehicle, to move the load handling device 310 in the X direction. To move the load handling device 310 in the Y direction, the first set of wheels 314 are lifted clear of the rails, and the second set of wheels 316 are lowered into engagement with the second set of rails. The drive mechanism can then be used to drive the second set of wheels 316 to achieve movement in the Y direction.

In this way, one or more robotic load handling devices 310 can move around above the top surface of the stacks 400 on the grid under the control of a central control system (not shown). Each robotic load handling device 310 is provided with means for lifting out one or more containers 40 from the stack 400. In the instance where multiple robotic load handling devices 310 are used, it will be appreciated that multiple containers 40 may be placed in to the storage system or removed from the storage system at any one time.

FIG. 4 shows a typical storage system as described above, the system having a plurality of load handling devices 310 active above the stacks 400 of containers 40.

It will be appreciated that any form of load handling 310 device may be in use and that any number of robotic load handling devices may be used. The storage and sortation system as shown in FIG. 4 is representative only. Moreover, the nature and size of shipping containers 40 will require a larger facility that that shown in FIG. 4.

In accordance with one form of the invention, the storage and sortation system described with reference to FIG. 4 above is used in conjunction with a shipping container system at a port as described in more detail below.

In use, containers 40 are removed from the ship 10 by crane load handlers 110 mounted and operable on gantry cranes 100. The containers 40 are loaded onto transversal load handlers 120, the transversal load handlers 120 being mounted on a conveyor 130. The transversal load handlers 120 transfer the containers 40 to a transfer point 140, where the containers 40 are picked up by robotic load handlers 310. The robotic load handlers 310 which travel on the grid 300, as described above with reference to FIG. 4. The robotic load handlers 310 move containers 40 into stacks 400, comprising several containers 40 on top of each other.

It will be appreciated that the containers 40 may be placed in the stacks 400 for temporary storage whilst awaiting onward transport. Alternatively, empty containers may be stored within the stacks 400 awaiting onward transport or removal for use.

Whilst the foregoing description is a basic description of the system in use in a shipping container port, it will be appreciated that combinations of the handling, storage and sortation aspects of the first aspect of the invention may be used in alternative configurations.

For example, FIG. 5 shows a shipping container port utilising the storage and sortation aspects of the embodiment of the invention described above when applied to the known situation shown in FIG. 2.

In use, containers 40 are removed from the ship 10 by crane load handlers 110 mounted and operable on gantry cranes 100. The containers 40 are loaded onto transversal load handlers 120, the transversal load handlers 120 being mounted on a conveyor 130. The transversal load handlers 120 transfer the containers 40 to a transfer point 140, where the containers 40 are picked up by robotic load handlers 310. The robotic load handlers 310 which travel on the grid 300, as described above with reference to FIG. 4. The robotic load handlers 310 move containers 40 into stacks 400, comprising several containers 40 on top of each other.

However, in the example shown in FIG. 5, the robotic load handling devices 310 may transfer any one of the containers unloaded to a second conveyance means 130'. The container 40 in question may be transferred at a transfer point 105' to a second crane load handler 110' on a second gantry crane 100'. The second crane load handler 110' transfers the container 40 to the second ship 10' for dispatch.

It will be appreciated that in comparison to FIG. 2, the storage and sortation of containers 40 within a port or from one ship 10 to another 10' can be made more compact and involve fewer steps.

FIG. 6 shows a further embodiment of the invention. All aspects of this embodiment common with the previous embodiment retain the same reference numerals. In this second embodiment of the invention, which is a variation of that described with reference to FIG. 3 above, several transversal load handlers 120 travel on conveyance means 130 in a way which may further increase the capacity of crane 100. Furthermore, further conveyance means 131 may be provided to allow for further containers 40 to be transferred from ship to storage or vice versa. It will be appreciated that provision of this second conveyance means 131 enables containers 40 to travel in opposing directions, one container 40 from ship to storage and another container from storage to ship. It will also be appreciated that multiple containers may be transferred in the same direction at the same time. However, it will be appreciated that a single conveyance means 130 or 131 that is capable of reversing direction is sufficient for the operation of the container shipping system.

FIG. 7 shows a plan view of a shipping container handling system of a known form, as described with reference to FIGS. 1 and 2 above. A ship 10 in a body of water 30 is moored to a dock 20. A container crane 100 comprises a crane load handler 110 capable of moving containers 40 to a vehicle 210. The container crane 100 can move along a ship 10 on a track 90.

In accordance with a further aspect of the present invention, as shown in FIG. 8, the crane load handler 110 may deposit the container 40 onto a transversal load handler 120 which positions and aligns the container 40 by suitable alignment means such that it can be accessed by a robotic load handler 310. Said alignment means may comprise sensor systems, proximity detectors or camera means being monitored by operatives.

It will be appreciated that the above-described system may be utilised to load shipping containers 40 directly on to container transporting vehicles or trains or other transport devices. FIG. 9 shows a container carrying goods train 410 under the grid 300 being loaded with a container 40 by a robotic load handler 310. It will be appreciated that goods trains arriving at the port may also be unloaded in the reverse manner to that described above.

FIG. 10 shows a plan view showing a train track 400 with a number of train carriages 410 thereon. Over the railroad track runs a special track section 420 of the grid 300 where robotic load handlers 310 can deposit containers 40 onto railroad cars 410. In certain crossover points 430 the robotic load handlers 310 can move from the grid 300 to the special track section 420. In order to load containers 40 onto railroad cars 410 under the crossover points 430, the train of railroad cars 410 would be shunted somewhat forwards or backwards.

FIGS. 11 and 12 show a variation of the embodiment shown in FIG. 6 with a separate support structure 170 riding on separate rails 190 carrying the tracks 130 and 131. Again it will be appreciated that only one of the conveyance means 130 or 131 for transferring the container 40 from crane 100 to the storage system is required but use of both 130 and 131 provides a more efficient system.

FIG. 13 is a schematic perspective view in more detail of the arrangement of FIGS. 11 and 12 in which the support structure for the conveyance means 130, 131 and the transversal load handlers 120 comprises a separate structure working in conjunction with an existing crane installation, the conveyance means 130, 131 and the transversal load handling means 120 comprising roller means.

As can be seen in FIG. 13, the containers 40 deposited on the tracks 130 and 131 are moved in respective opposite directions by roller means 200. The roller means act to move the containers 40 either to or from the storage means for onward transfer by suitable means to the ship (not shown). The containers 40 are moved in the respective opposite directions on tracks 130 and 131 as shown by the directions of the arrows.

The roller means 200 may comprise a series of independently driven rollers. There need not be a link between individual driven rollers. The individual rollers act to move each container on track 130 rightwardly with respect to the drawing. Once the container 40 reaches the end of the track 130, transversal adjusting means 140 enable each container 40 to be moved in to a position suitable to be collected and lifted by the load handling means operable on the storage system (not shown in FIG. 13). The transversal adjusting means 140 may comprise further roller means 201 which may comprise a further series of independently driven rollers.

It will be appreciated that the same system operates in a leftwardly direction with reference to the drawing for track 131.

Again there is no requirement for both conveyance means 130 and 131 to be used, only a single conveyance means 130 or 131 is required. However, use of both conveyance means allows containers 40 to be moved in opposite directions at the same time, thereby improving the efficiency of the system Advantageously, the use of independently driven rollers for roller means enables a system of accumulation to be utilised. The containers 40 on the conveyance means need not be moved in a one-in one-out sequence, the conveyance means 130, 131 may accumulate containers 40 to enable smooth operation of the load handling devices and storage system, in other words it is not always necessary for a container 40 to exit the conveyance means 130, 131 before a further container 40 may be input by the gantry crane 100.

It will be appreciated, however, that a linked system may be operated in which a continual flow of containers 40 enter and exit the conveyance means 130, 131 in a one for one manner.

FIG. 14 is a perspective view of a further form of the support structure of FIGS. 11 and 12 in which the conveyance means 130, 131 comprises interface plates disposed between the containers 40 to be moved and the drive means for moving the containers 40.

In the further embodiment described with reference to FIG. 14, interface plates 210 are mounted on the roller means 200, 201. The interface plates may be required to act between the containers 40 and the roller means 200, 201 as containers 40 may over time become warped and damaged and may not travel on roller means 200, 201 directly. It will be appreciated that the interface plates may take any form suitable and capable of carrying containers 40 on the roller means 200, 201.

As with the embodiment described with reference to FIG. 13, the conveyance means comprises two tracks, a first track 130 moving containers in a rightwardly direction and a second track 131 moving containers 40 in a leftwardly direction. It will be appreciated that in the embodiment described, both tracks comprise interface plates 210 however, it may be envisaged that different tracks comprise different interface plates and roller means.

The transversal adjusting means in the present embodiment comprises additional interface plates 240 and 241 driven by suitable roller means to enable adjustment of the positioning of the container 40 for collection by the load handling means (not shown in FIG. 14).

Advantageously, the use of interface plates 210 mounted on independently driven rollers or roller means again enables a system of accumulation to be utilised. The containers 40 on the conveyance means need not be moved in a one-in one-out sequence, the conveyance means may accumulate containers 40 to enable smooth operation of the load handling devices and storage system, in other words it is not always necessary for a container 40 to exit the conveyance means 130, 131 before a further container 40 may be input by the gantry crane 100.

It will be appreciated, however, that a linked system may be operated in which a continual flow of containers 40 enter and exit the conveyance means 130, 131 in a one for one manner.

The containers 40 may be positioned on the interface plates such that the corners of the containers 40 may be accessed by operatives located on the conveyance means. This is necessary as containers 40 transported by ship are stacked and locked together using suitable locking means at each respective corner (not shown in the Figures). Operatives located adjacent the conveyance means 130, 131 may be required to manually remove the locking means from the containers 40. Furthermore, containers 40 being moved from the storage system to a ship will require locking means to be manually inserted in to suitable brackets forming the corners of each container 40. This enables the containers 40 to be safely stacked on the receiving vessel. Operatives located adjacent the conveyance means 130, 131 may access the required brackets if interface plates are utilised.

A further embodiment is shown in FIG. 15. FIG. 15 is a perspective view of a further form of the support structure of FIGS. 11 and 12 in which the conveyance means comprises interface blocks 310 disposed between the containers 40 to be moved and the drive means for moving the containers, the corners of the containers 40 again being accessible to operatives from the support structure. FIG. 15 shows a system whereby operatives removing locking means manually from the containers 40 may load said locking means in to receptacles adjacent the conveyance means 130, 131. As containers 40 on the conveyance means 130 are moving, in this example only, rightwardly towards the storage and sortation system, the operatives will be removing the locking means from the containers 40. Once removed and deposited in the receptacles the locking means may be transferred via suitable lift means 450 to the area adjacent the leftwardly moving conveyance means 131 where operatives may insert the locking means in to the containers ready for use when the container is loaded on to the vessel 10.

As described above with reference to FIG. 14, in the system described with reference to FIG. 15, the containers 40 may again be positioned on the interface blocks 310 such that the corners of the containers 40 may be accessed by operatives located on the conveyance means. Operatives located on the conveyance means may remove the locking means from the containers 40. Furthermore, containers 40 being moved from the storage system to a ship that require locking means to be inserted in to container brackets may be handled on the second leftwardly moving track 131.

The locking means may comprise twist locks of a form usually associated with shipping and container uses. However, other forms of locking means may be envisaged.

Advantageously, the use of interface blocks 310 or plates 210 enables two relatively smaller containers 40a, 40b to be handled adjacent each other in a single position on the conveyance means as shown in FIG. 15.

In the embodiments described, it will be appreciated that the roller means 200, 201 need not comprise independently driven rollers but could comprise belt driving means or a chain-type driving means or any other suitable form of drive means capable of moving containers mounted thereon with interface plates, blocks or otherwise.

In this way, the conveyance means described above is capable of recirculating movement of containers 40 to and from transporting vessels whilst taking advantage of accumulation of containers 40 on the conveyance means and further enabling removal and insertion of locking means to secure the containers 40 in stacks when loaded on to suitable vessels.

FIG. 16a shows an additional form of shipping container handling system. As described above, the gantry crane 100 carries a crane load handler 110. In use the crane load handler is moved in to position above a container 40 on a vessel and the handler is lowered and the handler engages with the container 40 to be moved. The crane load handler 110 is then raised and the container 40 can be moved from the vessel to its predetermined location. The same transfer can happen in reverse, the crane load handler 110 engages and picks up the container 40 from a predetermined location and moves in to position above the appropriate point on the vessel for depositing the container 40.

It will be appreciated that the crane load handler 110, when used in this manner must be continually winched up and down to engage and deposit the target container 40. In one form of the invention as shown in FIGS. 16a and 16b a hydraulic lift 460 is provided adjacent the container 40 transfer system to engage with containers 40 and lift an engaged container 40 to a level closer to the crane load handler. In this way, the crane load handler 110 is not required to be winched up and down as frequently. Advantageously, this may make the loading and unloading of containers 40 quicker and more efficient.

Whilst it is envisaged that hydraulics may be required, any form of lift mechanism capable of lifting a loaded container 40 to a level where the crane load handler 110 may engage the container and move said container as required, may be used.

FIG. 17 shows a schematic perspective view of the storage and sortation system described above in accordance with a further form of the invention. In the system shown in FIG. 17, in order to enable operatives to access the containers 40 whilst in the storage and sortation system, predetermined rows 500 of the container stacks 400 may be omitted. This ensures that the containers 40 and their contents may be accessed.

Additionally, some containers 40 may require services to be provided thereto, for example power to enable a chiller unit to run in the container 40 and access may be required to switch supplies or utilities on and/or off. It will be appreciated that the services may be provided to the containers 40 via connection to the uprights of the storage and sortation system, the framework of the system comprising services routed therethrough. Suitable connections between the containers 40 and the framework of the system may be provided to enable power, light, air, fluids or gases to be routed through the framework as appropriate. UK Patent Application No GB1518115.9 filed on 13 Oct. 2015, from which the present application claims priority from, details a system for routing services through a framework such as that required for the present system and the content of this priority application is hereby incorporated by reference.

As shown in FIG. 18, the container load handling devices 310 operating on the grid structure of the storage and sortation system run on a double track system 300. The double track system allows container load handling devices to pass on adjacent grid squares in both the X and Y directions. Whilst this system provides for a dense packing solution in the storage and sortation system, it does not allow for the containers to be accessed by operatives as required and described above in relation to FIG. 17.

It will be appreciated that the double tracks shown in FIG. 17 comprise longitudinally extending extruded sections of double track. However, it is possible, in one form of the invention, for the tracks to be separated in to two separate tracks with a gap of a predetermined size in between. In this way, the separation in the tracks allows for a separation between the stacks 400 of containers 40 and therefore enable operatives to access the containers 40 between the stacks 400.

It will be appreciated that control and tracking of containers 40 in the storage and sortation area is undertaken under control of a utility capable of tracking the position of each container 40 removed from a ship 10 and placed in the storage and sortation area. The location of each individual container 40 is known to the utility, said utility being operable to instruct the robotic load handling devices to remove said required container 40 from the storage and sortation area as required.

Should a container 40 from the bottom of a stack 400 be required, several robotic load handling devices 310 may co-operate to remove containers 40 above the required container 40 in the stack 400. Containers 40 not required may be returned to alternative locations within alternative stacks 400. It will be appreciated that the containers 40 may be placed in the stacks 400 with a knowledge of their likely retrieval time, thereby ensuring the most efficient placement within the area via the robotic load handling devices 310.

It will be appreciated that the containers 40 may be provided with passive identity tracking means, for example barcoding. However any suitable form of identity tracking means may be used. Furthermore, the containers 40 may be provided with active identity tracking means or on board intelligence enabling absolute tracking of each individual container 40 through the port. Each or any container 40 may be provided with on board services or intelligence similar to that disclosed in UK Patent Application No . . . . Ref 000036 GB to Ocado Innovation Limited filed on 13 Oct. 2015, incorporated by reference as detailed above.

Furthermore, it will be appreciated that the uprights or grid 300 may be provided with sensor or tracking means in order to monitor the contents of the grid, the containers 40 or the structural integrity of the system as a whole. These services may include, but not be limited to camera means, alignment detection means, structural integrity sensor means such as ultrasonics means or potential drop means. The grid structure may be provided with services as disclosed in UK Patent Application No Ref 000045 GB to Ocado Innovation Limited filed on 13 Oct. 2015 detailed above and incorporated by reference.

It will be appreciated that in the embodiments described above, the robotic load handling devices 310 need not be of the form described, any suitable form of robotic load handling device may be used.

The invention claimed is:

1. A container handling system for handling shipping containers in a container port, the system comprising:
　a container load handling device;
　storage and sortation structure, the structure including two substantially perpendicular sets of rails forming a grid above a workspace beneath the grid, the workspace being configured to store a plurality of stacked containers, a plurality of robotic load handling devices operating on and above the rails, the robotic load handling devices each including a body mounted on wheels, a first set of wheels being arranged to engage with at least two rails of the first set of rails, a second set of wheels being arranged to engage with at least two rails of the second set of rails, the first set of wheels being independently moveable and driveable with respect to the second set of wheels such that when in motion only one set of wheels is engaged with the grid at any one time thereby enabling movement of each robotic load handling device along the rails to any point on the grid by driving only the one set of wheels engaged with the rails; and
　transfer means for transferring containers into and out of the storage and sortation structure, the transfer means including a first conveyance means operable between the container handling device and a first transfer point, and a first plurality of transversal load handling devices configured to receive containers delivered by the container handling device and to move containers along the first conveyance means to the first transfer point for collection by the robotic handling devices, the transfer means including a second conveyance means operable between a second transfer point and the container handling device, and a second plurality of transversal load handling devices configured to receive containers delivered by the robotic handling devices at the second transfer point and to move containers along the second conveyance means for collection by the container handling device.

2. A container handling system according to claim 1, wherein the first conveyance means is positioned above the second conveyance means and the transfer means comprises:
　a lifting means operable between the first and the second conveyance means.

3. A container handling system according to claim 1, wherein the first conveyance means is positioned above the second conveyance means and the transfer means comprises:
　a lifting mechanism configured to lift containers to a level closer to the container handling device for collection by the container handling device.

4. A container handling system according to claim 3, wherein the lifting mechanism is a hydraulic lift.

5. A container handling system according to claim 1, wherein the first plurality of transversal load handling devices are configured to align each container with a respective robotic load handling device of the plurality of robotic load handling devices of the storage and sortation structure.

6. A container handling system according to claim 1, wherein the second plurality of transversal load handling devices are configured to align with each container delivered by the robotic load handling devices.

7. A container handling system according to claim 1, wherein the transfer means is configured to ride on rails so as to align with at least one of the storage and sortation structure and/or the container load handling device.

8. A container handling system according to claim 1, wherein the first and second conveyance means comprise:
　a container accumulation means to enable accumulation of containers.

9. A container handling system according to claim 8, wherein the container accumulation means comprises:
　a plurality of independently driven rollers.

10. A method of transferring containers utilising a container handling system having:
　a container load handling device; and
　a storage and sortation structure, the structure including two substantially perpendicular sets of rails forming a grid above a workspace beneath the grid, the workspace being configured to store a plurality of stacked containers, a plurality of robotic load handling devices operating on and above the rails, the robotic load handling devices each including a body mounted on wheels, a first set of wheels being arranged to engage with at least two rails of the first set of rails, the second set of wheels being arranged to engage with at least two rails of the second set of rails, the first set of wheels being independently moveable and driveable with respect to the second set of wheels such that when in motion only one set of wheels is engaged with the grid at any one time thereby enabling movement of each robotic load handling device along the rails to any point on the grid by driving only the one set of wheels engaged with the rails; the method comprising:

transferring containers into and out of the storage and sortation structure by having a first conveyance means operable between the container handling device and a first transfer point, a first plurality of transversal load handling devices receiving containers delivered by the container handling device and moving containers along the first conveyance means to the first transfer point for collection by the robotic handling devices; and by having a second conveyance means operable between a second transfer point and the container handling device, a second plurality of transversal load handling devices receiving containers delivered by the robotic handling devices at the second transfer point and moving containers along the second conveyance means for collection by the container handling device.

11. A container handling system according to claim 2, wherein the first conveyance means is positioned above the second conveyance means and the transfer means comprises:

a lifting mechanism configured to lift containers to a level closer to the container handling device for collection by the container handling device.

12. A container handling system according to claim 11, wherein the lifting mechanism is a hydraulic lift.

13. A container handling system according to claim 12, wherein the first plurality of transversal load handling devices are configured to align each container with a respective robotic load handling device of the plurality of robotic load handling devices of the storage and sortation structure.

14. A container handling system according to claim 13, wherein the second plurality of transversal load handling devices are configured to align with each container delivered by the robotic load handling devices.

15. A container handling system according to claim 14, wherein the transfer means is configured to ride on rails so as to align with at least one of the storage and sortation structure and/or the container load handling device.

16. A container handling system according to claim 15, wherein the first and second conveyance means comprise:

a container accumulation means to enable accumulation of containers.

17. A container handling system according to claim 16, wherein the container accumulation means comprises:

a plurality of independently driven rollers.

* * * * *